March 21, 1939.   P. DUNSHEATH   2,151,092
ELECTRIC CABLE SYSTEM
Filed Oct. 12, 1935   2 Sheets-Sheet 1
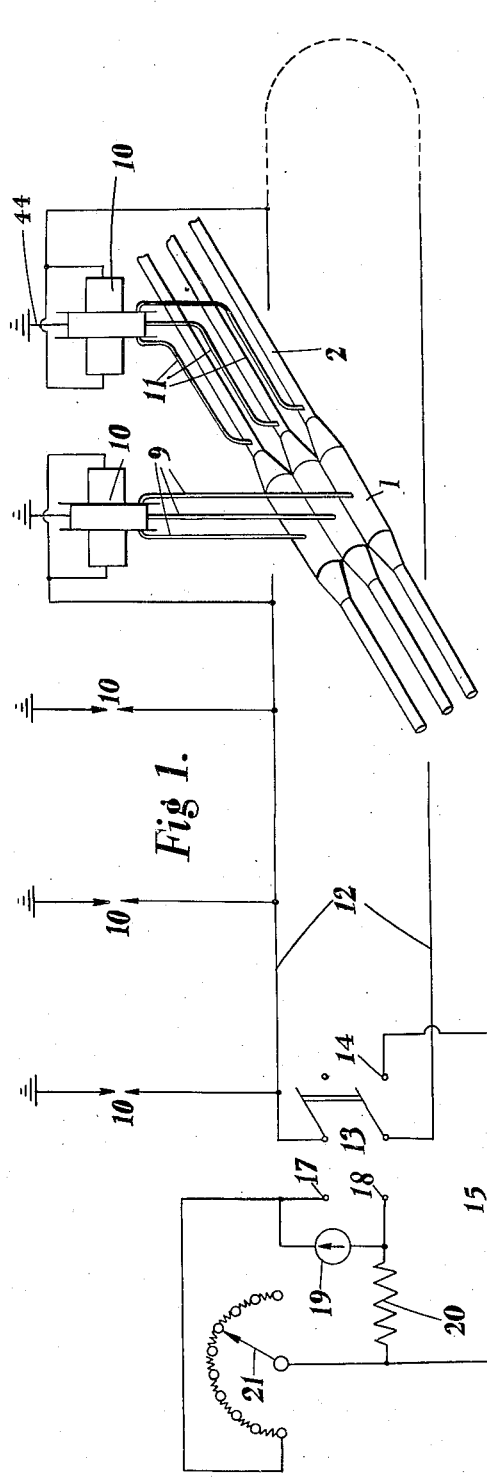
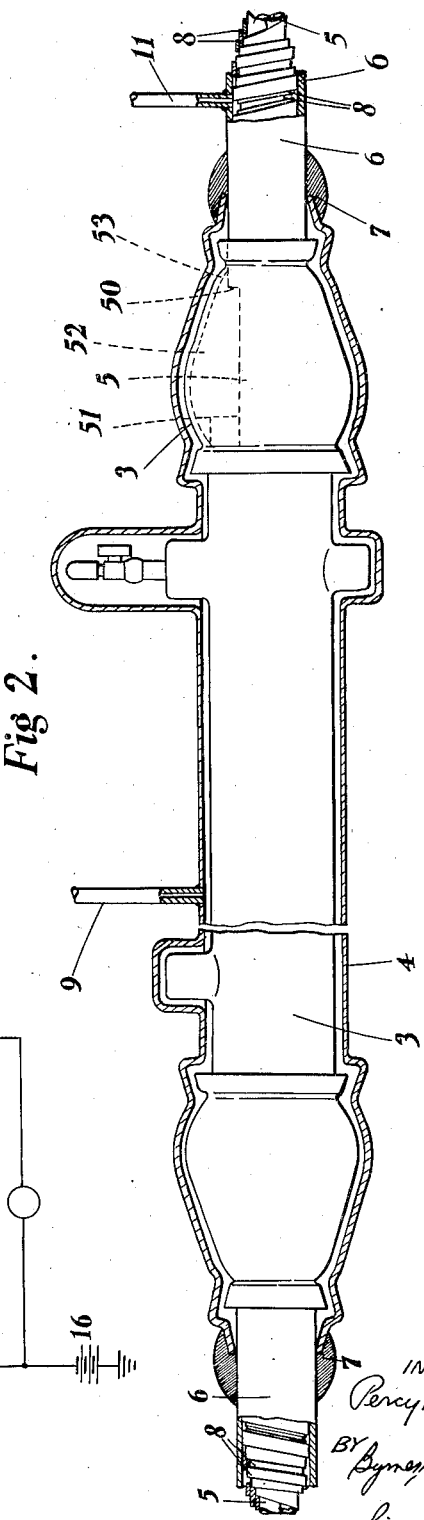

March 21, 1939. P. DUNSHEATH 2,151,092
ELECTRIC CABLE SYSTEM
Filed Oct. 12, 1935 2 Sheets—Sheet 2
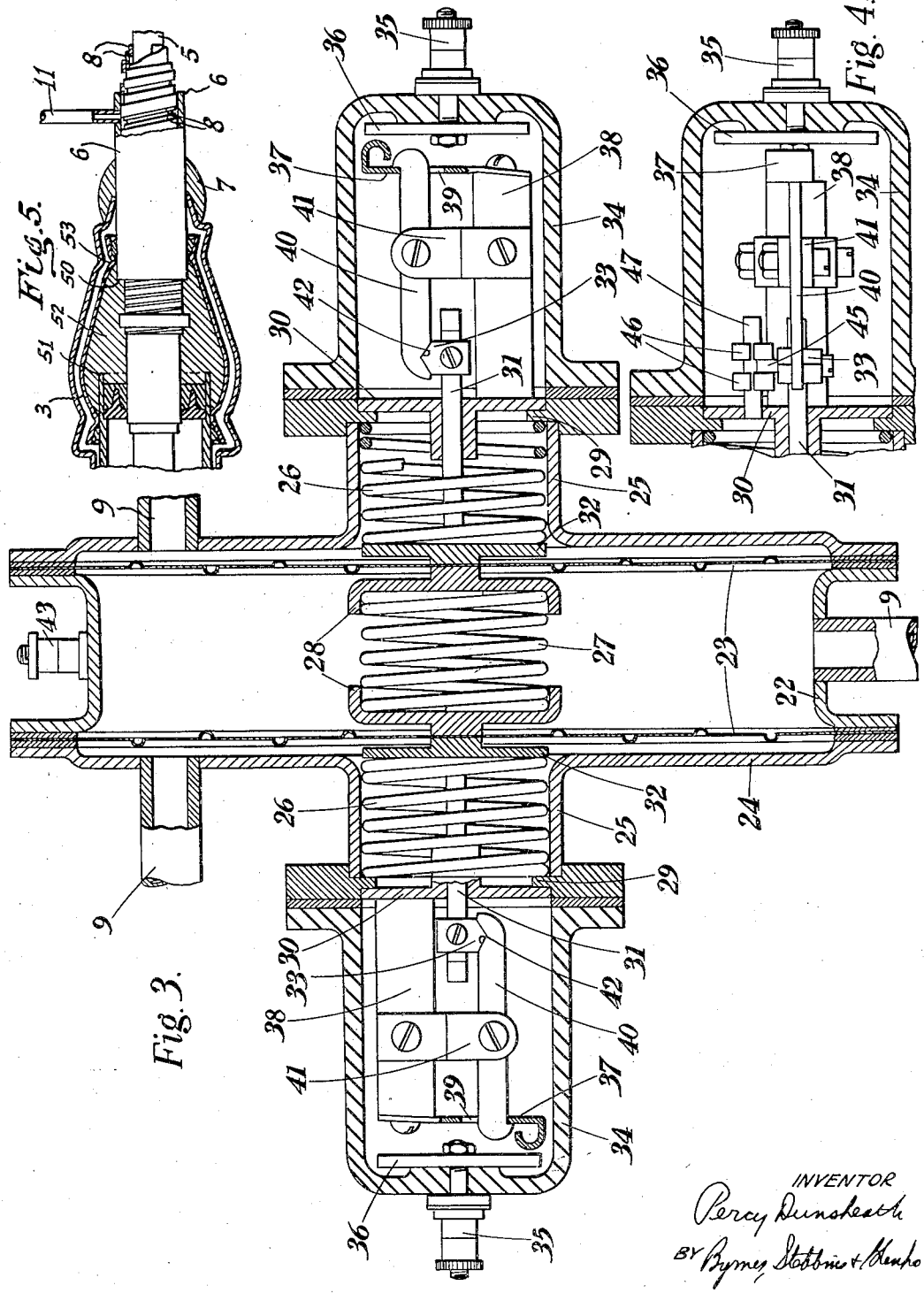
INVENTOR
Percy Dunsheath
BY Byrnes, Stebbins & Menko
His ATTORNEYS Patented Mar. 21, 1939

2,151,092

UNITED STATES PATENT OFFICE 2,151,092

ELECTRIC CABLE SYSTEM

Percy Dunsheath, Kent, England, assignor to W. T. Henley's Telegraph Works Company Limited, London, England, a British company Application October 12, 1935, Serial No. 44,735
In Great Britain October 27, 1934

4 Claims. (Cl. 177—311)

This invention relates to means for protecting electric cable systems of the kind in which the cables or the cable system as a whole (cables, joints and terminals) depend for the strength of their insulation to an important extent on the existence of gas under a pressure substantially above atmospheric pressure within the sheath of the cable. This type of cable will be spoken of hereinafter as "a cable with internal gas pressure". In such cables, where the internal construction permits free flow of the pressure gas along the cable, the pressure is substantially uniform in the cable and any fall of pressure due to local damage would be quickly made evident at an indicator communicating with the interior of the cable sheath at any point within a considerable range of cable length. There are however other types of cables with internal gas pressure in which there is no free flow of the pressure gas along the cable so that, when leakage of gas occurs at any point, the fall of pressure due to it is not transmitted along the cable or is only transmitted slowly. In such cases, an indicator connected with the interior of the sheath at some point will not suffice to give a quick indication of damage taking place at any other point in the length of the cable.

A cable of the kind just referred to is described in the specification of Patent No. 2,052,922. This cable has an impregnated paper dielectric and contains between the outside of the dielectric and the sheath cushions of compressed gas serving to accommodate the expansion and contraction of the impregnating compound. These gas cushions are cut off from each other by spacing strips or otherwise so that free longitudinal movement of the gas is prevented. Under normal conditions, these gas cushions are all at substantially the same pressure so that there is no tendency for longitudinal flow to take place. If however there is a leakage from one of the gas cushions so that the pressure falls, a tendency to longitudinal movement will be produced and slow leakage past the separating barriers between the gas cushions may take place so that, in course of time, a reduction of pressure over a considerable length of cable may be produced, thereby introducing the possibility of breakdown of the dielectric.

In order to protect such a cable system, it is necessary to have some means of indicating the occurrence of local leakage. The present invention provides a protective arrangement for cables and cable systems which is particularly applicable for indicating leakage in cables of the kind just described but is also generally applicable to cables with internal gas pressure.

This protective arrangement is of a kind, known for use with pipes or vessels, in which the article to be protected is enclosed in a pipe with clearance between the outside of the article and the inside of the pipe so that free longitudinal flow of gas can take place between the two. This pipe is sealed off in lengths and the interior of each length is connected to a pressure-responsive device which will give an indication of any substantial change of pressure taking place in the clearance space. Accordingly if leakage into the space takes place, the escaping gas will cause a rise in pressure there, and this will be communicated to the pressure-responsive device and will thereby be made detectable.

The clearance space need not be greater than will suffice to ensure free longitudinal communication. The pipe may be formed conveniently as a second sheath applied over the complete cable and may be spaced from the cable by an open helix of paper strip or by a similar projection formed by the reinforcement of the cable sheath.

It is preferable to fill the clearance spaces with gas at a pressure slightly above or below that of the atmosphere and to arrange an indicating device to show if this pressure falls or rises to atmospheric. This will protect the system against any error in operation due to a fault in the enclosing pipe and will provide an indication should both main cable sheath and enclosing pipe be simultaneously punctured. The pressure-responsive device, in such an arrangement, may be made to indicate the failure of the normal pressure in the enclosing pipe as well as any additional pressure caused by a leak in the cable.

It is preferred to group together a number of pressure-responsive devices, since this arrangement has the advantage that the whole of the group may be arranged to transmit indications by way of a single electric circuit. This may be done by causing all of the devices of a group to operate contacts placed in parallel in the circuit. By this means, the operation of any one of the devices of a group will indicate at the inspection point that there is a fall of pressure in one of the parts of the system adjacent to the place where the devices are grouped. Examination of these devices will then show which has been actuated so that the part of the system which is faulty can be readily ascertained.

The invention deals with cases where there are in a system two or more cables running side by side, for instance the three single core cables of a three phase system. In accordance with the invention a protective arrangement of the kind indicated is applied jointly to two or more cables working side by side by placing each of the cables in a separate pipe and by connecting two or more of the similar pipe lengths of different cables to one and the same pressure-responsive device. In this device the pressures in the different pipe lengths are balanced against each other so that the device is operated by differences in the pressures in the lengths of pipe.

In general and particularly for the type of cable referred to in the opening part of this specification, it is important that the pressure-responsive device should be able to indicate a small change in pressure due to leakage. In practice there is a difficulty in the way of realizing this desirable result, since changes of pressure in the pipe due to other normal causes may also occur to an extent comparable with the changes due to leakage. Such normal pressure changes are caused by the variation of temperature of the gas enclosed in the clearance space, which variations are due both to internal and external causes. In working in accordance with the present invention such normal changes of pressure are compensated for since they would occur to approximately the same extent in two cables running side by side. By balancing these pressures against each other normal similar changes will produce no resultant effect and only an abnormal change, such as that due to leakage will be made evident, hence it is possible in accordance with the invention, to use a more sensitive pressure-sponsive device than would otherwise be practicable and accordingly a small leakage may be detected; at the same time the combined pressure-responsive device is simpler and cheaper to manufacture and install than would be the case with separate devices for each cable.

The invention will be described further with the aid of the accompanying drawings which show by way of example the application of the invention to a three-phase cable system consisting of three single core cables.

Figure 1 shows diagrammatically a portion of the cable system, comprising a joint, arranged in combination with an electric signalling circuit.

Figure 2 shows partly in section the arrangement of the gas pressure spaces at a joint.

Figure 3 shows in section on an enlarged scale an indicating device arranged to serve a group of three lengths.

Figure 4 is a section of the right hand end part of Figure 3 on a plane at right angles to that of Figure 3.

Figure 5 shows in section one end of Figure 2.

The parts of the cable system are, for the purposes of protection against loss of pressure, divided into lengths. Each length consists either of a joint box 1 or a length of cable 2 between two joint boxes. Between the outer casing shown in Figure 1 and the pressure-containing casing, there is in each length a clearance space. This space is made small in order that the rise of pressure in it for a given leakage of gas from the cable may be comparatively great. From Figure 2, it will be seen that the joint box 3 is enclosed in an outer casing 4 which at each end is joined by means of a wiped joint 7 to the outer sheath 6 of a length of cable and that the space between the two enclosures 3 and 4 of the cable joint is closed at each end by this wiped joint 7. The inner sheath 5 of the cable encloses the pressure gas. The two sheaths are spaced apart by the helical lapping 8 consisting of the metal tape reinforcement for the inner sheath. Since this is applied in a continuous helix with the turns spaced apart, there is a continuous helical passage from one end to the other of each length of cable between the two sheaths 5 and 6. The method of sealing off this helical passage at the end of a joint box is shown in dotted lines at the right hand end of the box at Figure 2 and by the section of this part shown in Figure 5. The outer sheath terminates at the place marked 50. The inner sheath is continued and passes through a packing arrangement indicated at 51. The space 52 within the end of the box and between the wall of the box and the cable and the packing arrangements 51 and 53 is filled completely by running in molten metal. The space between the two sheaths 5 and 6 of each length of cable is in this way sealed off at the place of entry of the cable into the two joint boxes in which it is electrically connected to the two adjacent lengths.

Each joint 1 is provided with a connecting pipe 9 leading to the leakage indicator 10 for the group of three joints. A similar indicator 10 is also provided for each group of three lengths of cable 2, the connection between these lengths and the indicator being made by means of pipes 11.

To complete the system, an indicator 10 will be provided for each group of joints and for each length of cable between joints. These are indicated diagrammatically in the centre part of Figure 1. All these indicators 10 will be connected between one side of the pilot loop 12 and earth as shown in Figure 1. The dotted portion of the loop shown at the right hand end of the figure indicates a prolongation of the loop for the full length of the system or the portion of the system, the indicators of which are connected to the inspection station containing the apparatus shown at the left hand end of Figure 1. This apparatus comprises a two-way switch 13 which, when thrown over to the right hand side, connects one side of the loop 12 by way of the contact 14 to the alarm signal 15 and the battery 16, the other side of which is connected to earth. With this arrangement, when a contact is made at any of the indicators 10, a circuit is closed including the battery 16 and the alarm signal 15 so that an indication is given at the inspection station.

By throwing over the switch 13 to the left hand side, the loop is disconnected from the alarm signal 15 and is connected by way of contacts 17 and 18 with apparatus which provides for the location of the indicator at which contact has been made.

This apparatus comprises a galvanometer 19, a fixed resistance 20 and a variable resistance 21. It will be seen from Figure 1 that this apparatus together with the loop 12 forms a bridge circuit when the switch 13 is in the left hand position. Two arms of the bridge are formed by the fixed resistance 20 and a variable resistance 21 respectively. The galvanometer 19 is connected across the ends of these two arms. The loop 12 forms a resistance also connected across the galvanometer. The battery is connected between the junction of the resistances 20 and 21 and some point on the loop 12 where contact has been made by an indicator 10. The earth forms a part of this connection. It will be seen that, by adjusting the resistance 21, the bridge can be balanced and, from the value for the variable resistance 21 thus obtained taken in conjunction with the value of the resistance 20 and the resistance of the loop 12, the position of the indicator having the closed contact can be determined.

The construction of each of the indicators 10 is shown by Figure 3. The indicator comprises a chamber divided into three parts by two metal diaphragms. The central part of the chamber is formed by a cylinder 22, on each end face of which is clamped a flexible diaphragm 23. This clamping is effected by the end part of the chamber, which is a slightly dished disc 24, having a tubular extension 25 in the centre. The dishing accommodates the outward displacement of a diaphragm 23 and the central tubular part 25 houses a spring 26. A similar spring 27 is placed between the two diaphragms 23, being held in cups 28 each attached to the centre of one of the diaphragms.

The outer springs 26 are supported at their outer ends by a flange 29 projecting inwards at the end of the tubular extension 25. This flange also carries a disc 30, having a central aperture serving as a bearing through which slides a rod 31, the inner end of which is attached to the disc 32. This disc is attached to a diaphragm 23 and is acted upon by the inner end of a spring 26. The outer end of the rod 31 carries a projection 33.

The outer end of each rod 31 projects into a space enclosed by a bell 34 formed of insulating material which is mounted on the outside of the flange 29. The end of this bell carries a terminal 35 on the outside and a contact plate 36 on the inside, the terminal and plate being connected together. Within the bell is a spring contact member 37 mounted on the end of a supporting arm 38. The member 37 has in its upper part a slot 39 in which works the end of a pivoted catch 40 which is mounted on the support 41 carried on the arm 38. At the inner part of this catch 40 is a notch 42 which receives the end of the projection 33 on the sliding rod 31. The drawings show the relative positions of the parts when the pressures are correct, that is to say, when the indicator is in the inoperative position. If a rod 31 slides either inwards or outwards from the position shown, the projection 33, pressing against one of the faces of the notch 42, tilts that end of the catch 40 upward and thereby disengages the other end from the spring contact member 37 which then moves outward to make contact with the plate 36.

The central part of the body of the chamber carries a terminal 43 which is connected to earth by the wire 44 (Figure 1). Metallic parts between the terminal 43 and each contact member 37 provide continuity of electrical connection and accordingly, when a member 37 is released, one of the terminals 35 is connected through the device and the wire 44 to earth.

By reference to Figure 4, it will be seen that each projection 33 has a laterally extending finger 45 which co-operates with two indicating collars 46 which slide with some friction on the fixed pin 47 which lies parallel with the rod 31. Accordingly any displacement of the projection 33 from its normal central position will be accompanied by the movement of one of the collars 46 along the pin 47 and the displaced collar will not return to its initial position even if the projection 33 comes back to its normal place. Accordingly on inspecting an indicator on which a contact has been closed, it will be possible to recognise the direction of the movement which produced the closing of the contact by examining the indicating collars 46.

As shown in Figure 3, three pipes 9 connect the three parts of the indicator chamber with the three members of the lengths of the system with which the indicator is associated. With this arrangement, a signal will be given and the cause of the signal can be ascertained by examining the indicating collars 46 for any failure in the group except a very unlikely one in which faults occur simultaneously and with equal rapidity in all three clearance spaces of the group.

If leakage occurs from the cable into the clearance space connected with the central part of the chamber, both diaphragms 23 moving outwards and the two outer collars 46 are displaced towards the outer ends of their pins 47. If a fault occurs causing a rise of pressure in one of the end parts of the chamber, the adjacent diaphragm moves inward while the other diaphragm only has a small displacement, if any. This is indicated by the inward displacement of one of the collars 46 while the other three collars remain undisturbed. If faults occur causing a rise of pressure simultaneously in the two end parts of the chamber, the two diaphragms move inwards accompanied by the two inner collars 46. If faults occur causing simultaneous rises of pressure in the centre part and one of the end parts of the chamber, the diaphragm between these two parts is not materially displaced but the other diaphragm moves outwards, displacing outwards the outer collar 46 associated with it.

As previously indicated, it will generally be advantageous to strengthen the protection by arranging that the indicators show when a fault occurs in the pipe. With the arrangement indicated, this can be done conveniently by filling the clearance spaces with gas to such an extent that it normally has a pressure above that of the atmosphere, for instance, an absolute pressure of 2 atmospheres. If a failure occurs in the wall of the pipe, the pressure falls in the length including the fault and there is a corresponding fall of pressure in the part of the chamber and the indicator connected with this part of the system. This fall of pressure or any group of simultaneous falls of pressure will have actions which are the converse of the rises of pressure previously discussed and will result in the giving of an indication that a fault has occurred.

It will be understood that in the preceding description and in the following claims the word "pipe", as applied to the outer enclosure of the parts of the cable system, is being used in the most general sense as indicating an appropriate casing for enclosing the respective part of the system with small, but definite, clearance. In the example illustrated, the "pipe" on the cable lengths is the outer sheath of the cable; the "pipe" on the joint box is the casing 4 which is formed of two parts which are joined together on the horizontal plane by a metallic joint (not shown) at each side.

It will be understood that care must be exercised in the making and applying of the "pipe" and in the sealing off of the lengths from each other in order to obtain satisfactory operation of the protective arrangements. In the example illustrated, the sealing off is effected in each end of the joint box 3. The method of doing this is shown by dotted lines at the right hand end of the box in Figure 2.

What I claim as my invention is:
1. The combination with a plurality of co- extensive cables each containing gas under pressure and in each of which there is substantially no free flow of the gas along the cable, of means for indicating leakage of gas occurring at a point in a cable before this leakage is directly manifested at other distant points in the cable, comprising gas-tight enclosures for the respective cables each enclosure surrounding a co-extensive substantial portion of its corresponding cable and providing a space around the portion of the cable into which gas leaking from any point of the enclosed portion of the cable will flow, the total space between the enclosure and the cable being of such dimension as to produce a measurable rise of pressure in the space for leakage from any point of the enclosed part of the cable before such leakage is manifested at other distant enclosed points, and indicating means responsive only to differential pressure changes in the enclosures of the plurality of cables.

2. The combination with a plurality of co-extensive cables each containing gas under pressure and in each of which there is substantially no free flow of the gas along the cable, of means for indicating leakage of gas occurring at a point in a cable before this leakage is directly manifested at other distant points in the cable, comprising gas-tight enclosures for the respective cables each enclosure surrounding a co-extensive substantial portion of its corresponding cable and providing a space around the portion of the cable into which gas leaking from any point of the enclosed portion of the cable will flow, the total space between the enclosure and the cable being of such dimension as to produce a measurable rise of pressure in the space for leakage from any point of the enclosed part of the cable before such leakage is manifested at other distant enclosed points, and indicating means responsive only to differential pressure changes in the enclosures of the plurality of cables, the enclosures containing fluid under a pressure which is different from atmospheric pressure and which is different from the pressure of the gas in the cable whereby a leakage in the enclosure may also be detected.

3. The combination with a plurality of co-extensive cables containing insulating fluid under pressure, the cables being of a character in which the free flow of fluid along the cable is restricted by the internal structure of the cable, of means for indicating leakage of gas occurring at any point in any one cable before this leakage is directly manifested at distant points in the cable, comprising a continuous series of enclosures surrounding the respective cables, the successive enclosures along the several cables being of substantially corresponding length and capacity so that for any enclosure in the series along one cable there is a corresponding enclosure along another cable, each enclosure being adapted to provide an enclosed space to receive any fluid leaking through the cable at any point which it encloses, the total space between each enclosure and the cable being of such dimension as to produce a measurable rise of pressure in said space by reason of leakage into it before such leakage is manifested at other distant enclosed points, and indicating means responsive only to differential pressure changes in corresponding enclosures of the plurality of cables.

4. The combination with a plurality of co-extensive cables each containing fluid under pressure and in each of which the free flow of fluid along the cable is restricted by the internal structure of the cable, of means for indicating leakage of fluid occurring at any point in a cable before this leakage is directly manifested at other distant points in the cable comprising gas-tight enclosures for the respective cables, each enclosure surrounding a co-extensive substantial portion of its corresponding cable and providing a space around the portion of the cable into which fluid leaking from any part of the enclosed cable will flow, the total space between the enclosure and the cable being of such dimension as to produce a measurable rise of pressure in the space for leakage from any point of the enclosed part of the cable before such leakage is manifested at other distant enclosed points, indicating means responsive only to differential pressures in the enclosures of the plurality of cables, and signalling means for indicating in which of the plurality of cables the pressure rise in the leakage space has occurred.

PERCY DUNSHEATH.